United States Patent
King

[11] 3,863,364
[45] Feb. 4, 1975

[54] EDUCATIONAL/NAVIGATIONAL DEVICE

[75] Inventor: Bruce King, Forest Row, Sussex, England

[73] Assignee: King Scientific Limited, London, England

[22] Filed: Sept. 5, 1973

[21] Appl. No.: 394,512

[30] Foreign Application Priority Data
July 24, 1973 Great Britain .................. 35252/73

[52] U.S. Cl. .................................................. 35/43
[51] Int. Cl. .......................................... G09b 27/04
[58] Field of Search .................. 35/42.5, 43, 44, 47

[56] References Cited
UNITED STATES PATENTS

| | | | |
|---|---|---|---|
| 1,419,604 | 6/1922 | Beckley | 35/44 X |
| 2,135,287 | 11/1938 | Houston | 35/43 |
| 2,372,487 | 3/1945 | Hagner | 35/43 |
| 2,402,194 | 6/1946 | Wolfe | 35/43 |
| 2,460,346 | 2/1949 | Hagner | 35/43 X |

*Primary Examiner*—Wm. H. Grieb
*Attorney, Agent, or Firm*—Fleit & Jacobson

[57] ABSTRACT

A device for displaying the positions of at least some of the celestial bodies of the celestial sphere for any point on the earth's surface at any time, comprising a flexible hemispherical envelope presenting an inwardly concave face and an outwardly convex face with the positions of the desired celestial bodies marked thereon, the envelope being capable of manipulation to move surface portions between the said concave and convex faces.

9 Claims, 3 Drawing Figures

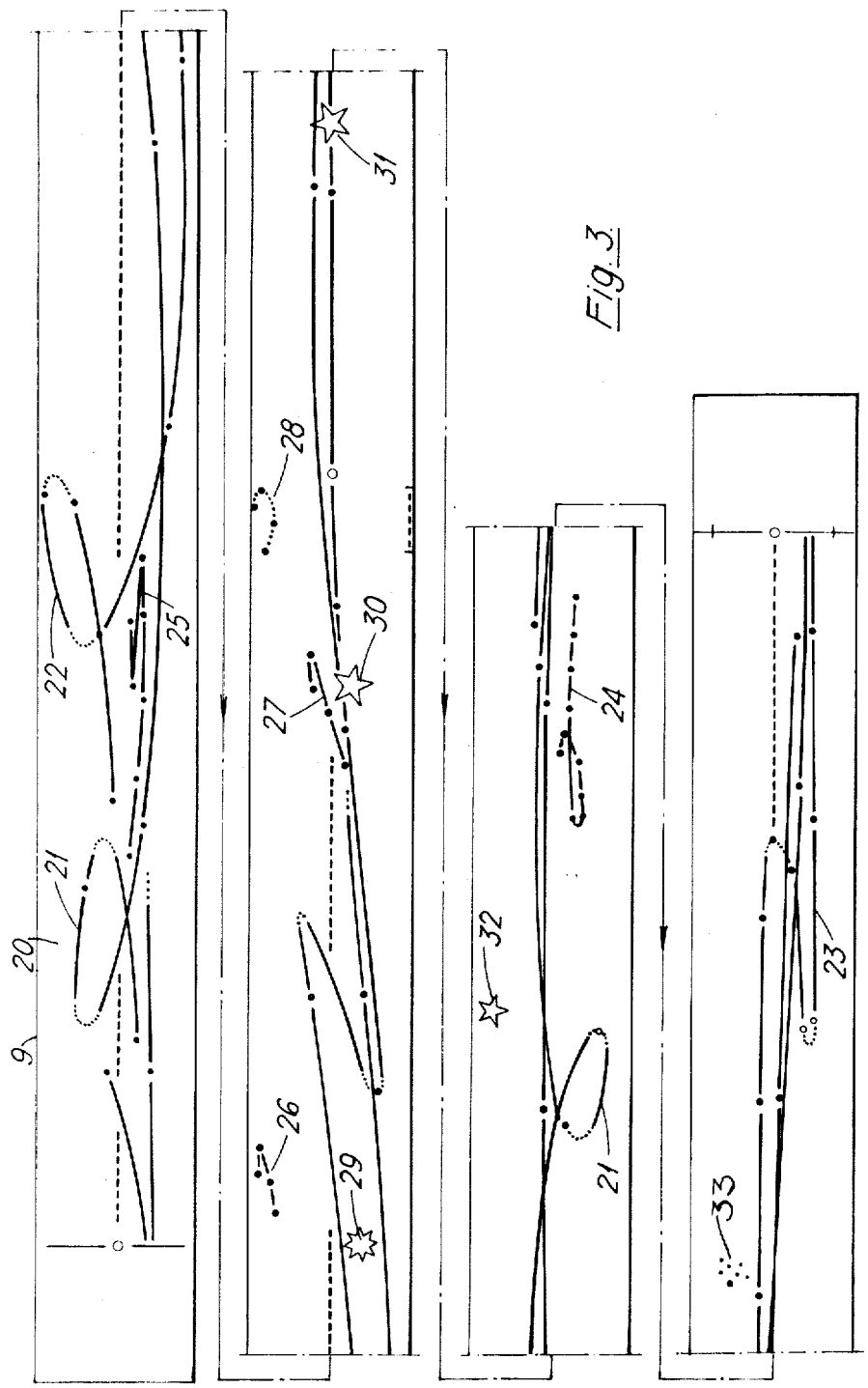

3,863,364

EDUCATIONAL/NAVIGATIONAL DEVICE

The present invention relates to an educational and/or navigational device which provides a display representing the positioning of at least some of the celestial bodies of the celestial sphere and may include representation of the positioning of the sun, planets and other stars and constellations.

Hitherto the celestial sphere has been represented either in the form of a flat, rotatable disc depicting at least the major celestial bodies and provided with a suitable mask to delineate the "visible" hemisphere appropriate to any particular point on the earth's surface, or in the form of a sphere the external surface of which has printed thereon a "mirror image" of a display representing the positions of at least the major celestial bodies of the entire celestial sphere. The flat disc type of device has the serious disadvantage that the starfield is necessarily distorted in that it represents a spherical display in the form of a plane projection, and it is well known that transformations of this kind involve considerable distortion. Similarly, the "celestial sphere" type of device has the drawbacks that it must be viewed from the outside and thus involves considerable imaginative effort to visualize the actual display seen from the earth's surface, and that it is not easy to allow for masking of the "visible" portion appropriate to any point on the surface of the earth.

According to the present invention there is provided a device for displaying the positions of at least some of the celestial bodies of the celestial sphere, comprising a flexible spherical envelope bearing the entire celestial sphere on its exposed surface, said envelope being disposed in a hemispherical configuration presenting an inwardly concave wall and an outwardly convex wall joined by a horizon rim, whereby manipulation of the envelope presents a different truly hemispherical portion of the celestial sphere on the inwardly concave surface of the envelope. By simple manipulation of the flexible envelope it is thus possible to present a different portion of the celestial sphere on the inwardly concave part of the device and this eliminates the need for the conventional masking to delineate the boundaries of the visible portion of the celestial sphere pertinent to any particular point on the earth's surface. Moreover, by similar manipulation it is possible to simulate changes in the visible portion of the celestial sphere with lapse of time.

Since the visible portion of the celestial sphere is displayed on a truly hemispherical surface the display obtained has no distortion whatsoever in the concave portion except at the actual horizon rim, and has the additional advantage of being able to simulate time lapse and change of geographical position on the earth's surface.

Desirably the appropriate celestial bodies may be marked on the surface of the flexible envelope by being printed in a permanent ink which will resist the effects of repeated flexure of the surface and general wear by friction of the surface. The envelope may conveniently be made of natural or synthetic rubber or of any other natural or synthetic flexible material and may more conveniently be collapsed by evacuation.

Alternatively the envelope may be made of a very thin material over an internal rigidifying structure. For example a very tightly woven black nylon fabric (to resist tearing) on the outside may be backed by a silicone rubber spray coated on the inside to act as a vacuum seal. The thickness of the combination may be as little as 0.5 mm or less. In place of the woven nylon silicone rubber combination any other suitable material may be used, for example a coated spun-bonded material, e.g., that sold under the Trade name "TYVEK." Such materials can be thermoformed to the desired shape.

Suitably two pegs may be formed on the surface of the flexible envelope coincident with the location of the north and south celestial poles and more suitably one or both of these pegs may take the form of valves which allow the flexible body to be evacuated and then sealed.

Advantageously a suitable lubricant such as graphite or other powdered lubricant, grease or any other fluid lubricant or one of the recently available lowfriction surface coatings may be injected or otherwise introduced in suitable quantity into the envelope, for example by way of one of the above mentioned valves. Once the inside surface of the flexible envelope has been evenly lubricated it is possible readily to change at will the presentation on the concave surface of the hemispherical device by a simple rolling movement transferring some surface portions across the horizon rim between the inwardly concave and outwardly convex surfaces of the device. The rim of the collapsed envelope represents the horizon in that it forms the boundary between the so-called "visible" and "invisible" portions of the celestial sphere.

The adaptability of the device to suit any point on the surface of the earth can readily be appreciated. In the northern hemisphere, the north celestial pole will always remain within the inwardly concave portion of the flexible body and, in particular in London the north celestial pole will always remain at a position 51° 30' above the horizon rim. Similarly, in the southern hemisphere the south celestial pole will always be within the inwardly concave portion of the device. If the device is used at eithher pole of the earth, the celestial pole positions will lie at the centre of the concave and convex surface portions, and when the device is used at the equator the two celestial poles of the device will lie on the horizon rim defining the boundary between the outwardly convex portion and the inwardly concave portion.

If the appropriate celestial pole is held at a fixed angular displacement from the rim of the device, the device can be manipulated by a rolling action of the fingers causing the stars and constellations closest to the poles to orbit around the poles and other stars and constellations can be seen to "rise" and "set" over the horizon rim of the device.

In a first possible form of the device it is envisaged that the horizon rim of the device be reinforced by an internal ring of metal or plastics material, suitably of circular cross-section, situated within the collapsed body at the horizon. The function of this ring is to hold the instrument true to its hemispherical form and to provide stability. In order to prevent the material of the envelope becoming permanently set if it is kept for a prolonged period in the same position the elasticity and thickness of the material should be chosen appropriately. Furthermore it is advantageous for the rim to have a sufficient radius preferably 5 mm or more.

The latitude, time and date settings could be imprinted on the star field in the form of graduated circles. Alternatively, in order to relieve the star field from such printed obstructions, several different small external suitably calibrated overlays of acetate or similar material may be provided, one for each latitude, so as to be simply positionable momentarily within the inwardly concave portion of the device to determine the setting required for a particular latitude, time and date. If desired, such an overlay bearing information pertinent to the inwardly concave surface may alternatively be placed over the outwardly convex surface of the device taking as a reference point the outer visible celestial pole because the portions of the inner visible and outer non-visible celestial poles will always exhibit a strictly defined mutual relationship.

In an advantageous construction the only additional markings on the surface of the envelope other than the representations of the celestial bodies are a line indicating the great circle of the celestial equator calibrated in hours of Right Ascension and a line indicating the great circle of the Ecliptic calibrated in months and days of the year.

With this arrangement two accessories can be provided, one of these being a "Meridian Strip" that is an arcuate strip of rigid transparent plastics material, curved to conform to a part of the "hemispherical surface of the envelope, provided near one of its ends with an aperture or ferrule to fit over the valve cap, to allow the Meridian Strip to pivot about the valve cap. The strip represents a ruled Meridian and Declination scale (in degrees), the strip being just sufficiently resilient to enable it to be fitted either to the valve cap on the concave surface or on the convex surface.

The second accessory is an Hour Circle in the form of a circular dished disc, calibrated in equiangular calibrations representing the 24 hours of the day, the disc being mounted for rotation about either of the valve caps, and being lockable in any selected rotational position.

A preferred form of the device employs an inner rigid hemispherical shell of plastics or other suitable material and of such dimensions as to be enclosed snugly within the flexible envelope while allowing free movement of the skin of the envelope over the surface of the inner rigid shell. Desirably the surface of the inner rigid hemisphere may be smoothly polished and may present a rounded and smoothed rim. In this particular form of the device one of the two above mentioned valves coincident with the celestial poles may additionally have a small, smooth inwardly projecting nipple which engages loosely in concentric circular tracks or grooves machined or otherwise moulded in the inner rigidifying hemisphere at regular intervals, for example at every 5° of angular displacement from the centre of the inwardly concave portion of the hemispherical shell. In this way, the celestial poles may be fixed at will at a position representing a particular circle of latitude and the device may then be manipulated so that the associated celestial pole retains its elevation above the horizon. Alternatively, because the two poles have always a strictly defined mutual relationship the said tracks or grooves may suitably be placed on the outwardly convex surface of the rigidifying hemispherical shell while still facilitating precise location of the pole within the inwardly concave portion of the hemisphere. Each of the inwardly projecting nipples of the valve will be held in the corresponding track by the action of the differential pressures acting outside and within the device where the flexible hollow body is evacuated and the setting may be changed to a different latitude simply by lifting the nipple against the pressure differential and moving it to any other desired track.

In order that the present invention may more readily be understood the following description is given of one embodiment of celestial display device, merely by way of example, reference being made to the accompanying drawings in which:

FIG. 3 shows a much simplified but typical overlay which may be attached to the device of FIGS. 1 and 2 in order to illustrate the movement of planets in the zodiacal belt.

Figure 1:
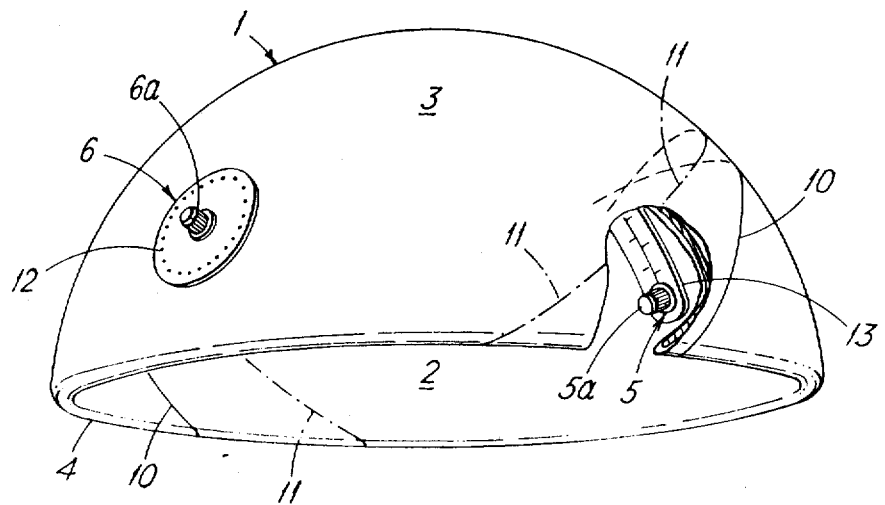
FIG. 1 shows a perspective view of a preferred embodiment of the device according to the present invention.

In FIG. 1 the device designated generally 1 consists of a flexible plastics envelope initially spherical in form and collapsed into the form of a hollow hemisphere so as to present an inwardly concave surface portion 2 and an outwardly convex surface portion 3 delineated by a horizon or peripheral rim 4. A valve 5 enabling discharge of any residual air within the flexible envelope is, in this particular illustration, positioned on the inwardly concave surface portion 2 of the envelope and a similar valve 6 is positioned on the outwardly convex surface portion 3.

The two valves 5 and 6 are intended to serve as markers for the north and south celestical poles of the celestial sphere. Since, in this instance the valve 5 marks the position of the north celestial pole, the configuration shown in FIG. 1 will be representative of the configuration of the heavens as viewed from a point in the northern hemisphere close to the Equator where the north celestial pole appears low down near the horizon. The markings of the various celestial bodies on the surface of the envelope of the device will be correctly positioned in relation to the north celestial pole so that the entire picture of the heavens will be correct when viewed from the appropriate point on the surface of the earth. Suitable manipulation of the flexible envelope of the device can achieve the effect of causing some of the stars or constellations or possibly even the sun and planets to "set" by moving across the horizon line 4 onto the outwardly convex surface portion 3 of the device and other celestial bodies to "rise" by being moved across the horizon rim 4 in the opposite direction so as to appear on the inwardly concave surface portion whereas previously they coincided with the outwardly convex surface portion.

The main rigidifying hemispherical shell 7 has seventeen separate circular tracks or grooves 8 moulded in its concave surface concentric to the horizon rim of the shell and a single point indentation at the bowl centre, these acting to define loci of movement of the nipple of valve 5 at different elevations above the horizon rim.

As illustrated in FIG. 1, the surface of the envelope is marked with two lines. The first of these lines, line 10, illustrates the Great Circle of the Celestial Equator and this is calibrated in hours of Right Ascension. The second line, line 11, is the Great Circle of the Ecliptic and this is graduated in months and days of the year.

The nipples of the valves 5 and 6 are provided with screw threaded caps 5a and 6a and these serve two purposes. Firstly, an hour circle 12 can be secured under one of the screw caps, the hour circle comprising a transparent plastics material dished disc which is graduated in 24 equiangular segments and marked at 90° intervals as noon, midnight, 6a.m. and 6 p.m.

A further accessory is a meridian strip 13 in the form of an arcuate strip of transparent plastics material which is pivotable about the cap 5a or 6a the latter passing through an aperture or ferrule in the meridian strip for this purpose. The arcuate strip covers a significant part of the great circle, the strip being graduated with two sets of graduations, one to each side of a central Meridian line, one being intended for use on the inner surface of the hemisphere and one intended for use on the other surface of the hemisphere.

In use, in order to determine any point on the celestial sphere knowing its Right Ascension and Declination, one first of all determines which celestial hemisphere the point will be in, a positive Declination indicating the northern celestial hemisphere and a negative Declination the southern celestial hemisphere. The Meridian Strip 13 is then centered on the appropriate pole and is aligned with the particular hour of Right Ascension appearing on the Celestial Equatorial Great Circle 11. The Declination may now be read off from the degrees scale marked around the Meridian Strip, thus determining the required point.

In order to determine to good approximation the visible sky for any given latitude, date and time, assuming, for example, that the observer is in the northern terrestial hemisphere, the north celestial pole nipple is positioned in the track or groove 8 most nearly corresponding to the given latitude at which the observer is situated. In this connection 0° is at the horizon rim of the bowl and 90° is the bowl centre. The positioning can be effected by pulling on the valve and "clicking it up" for the 0 position to the required latitude track or groove 8. The envelope 1 of the device is now manipulated so that the month marked on the Ecliptic Great Circle appears at some point within the bowl of the hemisphere. With the hour circle fixed at the north celestial pole, the cap is lightly secured and the hour circle can thus rotate freely. The Meridian Strip is then positioned on the north celestial pole and is aligned so that it intersects the Ecliptic Great Circle line at the particular day of the particular month when the observer is carrying out this operation. The hour circle is then rotated so that the "12 midnight" position lies along the line of the Meridian Strip and the cap is fastened. The Meridian Strip may then be removed and the envelope is then manipulated so that the particular time of day of the hour circle at which the observation is being made is brought closest to the horizon rim of the device. The nipple being positioned in the correct "latitude track" ensures that the manipulation manoeuvres the envelope to the correct position so that the actual sky visible at the time is illustrated on the inner surface of the hemisphere. It should be noted that the hour circle reads clockwise at the north celestial pole, if it is felt that the positioning of the hour circle within the concave side of the hemisphere interferes with the viewing of the representation of the visible sky, then as an alternative the hour circle may be placed under the valve cap on the convex face of the hemisphere. In this instance, the disc will be read in an anti-clockwise direction.

The particular day of the month is aligned with the Meridian on the convex surface of the hemisphere and the "12 noon position" is set against it. As before, the division on the hour circle nearest the horizon rim will indicate the local time of the visible sky within the hemisphere, that is on the concave side thereof.

As the sun moves through the Ecliptic over the course of one year, any particular star or constellation will be found to rise approximately 1 hour earlier every 2 weeks and therefore for most practical purposes one need only readjust the hour circle every 3 or 4 days. It follows that when a particular star or constellation first crosses the horizon rim, the hour circle indicates its rising time. For greater accuracy, variations between local time and mean solar time at the sun's Zenith on that date should be allowed for when first setting the hour circle against the meridian.

An alternative approximate method of adjustment using neither the hour circle nor the Meridian Strip, involves locating the particular date on the Ecliptic Circle and finding the hour of Right Ascension which is nearest to it on the Celestial Equator. The envelope is then moved so that the hour of Right Ascension determined above is just setting, i.e., it lies on the western side of the horizon rim. The position of the envelope will now represent the visible sky at 90°, that is 6 hours of time past its noon position. The hour of Right Ascension now setting therefore represents 6 p.m. local time.

The visible sky at any hour can now be found by further rotating the envelope the required number of hours of Right Ascension beyond the 6 p.m. reference hour. For example, if the hour of Right Ascension representing 6 p.m. local time is, say, 4 hours, then to determine the visible sky at 11 p.m. local time one rotates the envelope by 11 minus 6 which equals 5 hours of Right Ascension so that the figure 9 will now appear on the horizon rim. Again to afford greater accuracy, variations in local time from mean solar time on the particular day must be accomodated when establishing the reference hour of Right Ascension representing a further 90° of rotation of the sky from its position when the sun was culminating.

The basis of these methods of setting up the device lies in an approximation, namely that sufficient for the purposes of stepping the astrohemisphere the sun may be considered to be at its Zenith at noon on every day throughout the year to an observer stationed anywhere on earth. When stricter accuracy is required, this can be achieved by setting the local time at which the sun culminates (i.e., reaches its Zenith) against the hour circle. Of course this time will vary throughout the year. Hence, the part of the Ecliptic (Zodiac) in which the sun is located at any particular day of the year will culminate or reach its Zenith at noon. Thus the device need only be calibrated for the position of the sun along the Zodiac over the year, whereupon one can set the hour circle against that reference.

Thus, once the hour circle has been set, any convenient way of perceiving its further rotation with respect to the general form of the device will indicate time lapse between the sky at noon and the sky at the desired hour. Time lapse can be read against the reference of the horizon rim in that it represents a clearly defined "land mark" with respect to the overall form.

Finally, depending on whether the hour circle be fixed at the visible pole or at the other pole (a convenient measure to relieve the star field from obstruction), then either "12 midnight" or "12 noon" will be aligned with the position of the sun representing noon on a particular day and in both cases the hour nearest the horizon rim will give the precise time of the sky seen within the bowl of the hemisphere.

When the hour circle is fixed at the north pole it always reads in a clockwise sense, and at the south pole it always reads in the anti-clockwise sense, and is for this reason marked only at 6 hour intervals to enable ease of reading in either sense.

It will be apparent that, with the device according to the present invention, it is possible to provide a representation of the night sky at any point in the world at any time of day at any day of the year. Furthermore the represented heavens are displayed in a hemisphere exactly as they appear to the eye of the observer.

In an alternative construction tracks 8 may include twenty four small indentations into which the nipple of valve 5 can be received to provide a guide enabling the device to be progressed step-wise at hourly intervals if this should be required.

Figure 2:
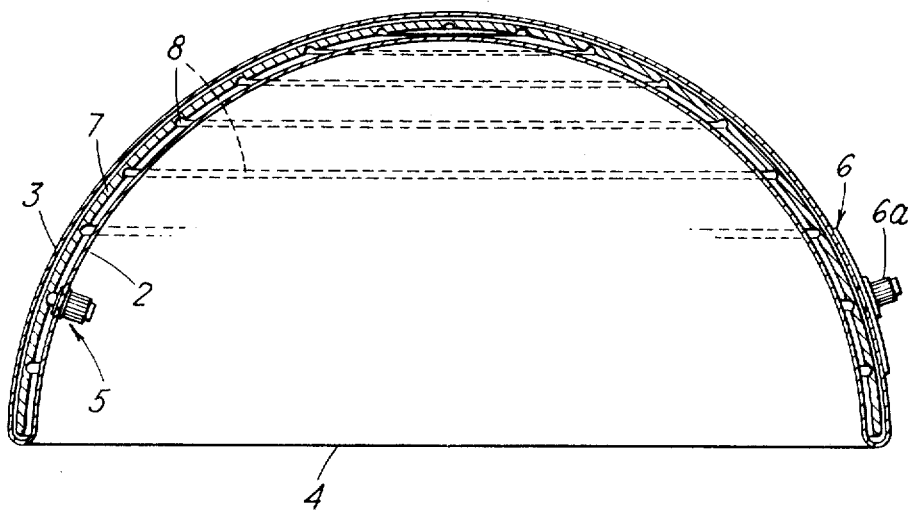
FIG. 2 shows a transverse sectional view of the device of FIg. 1.

In order that the device of FIGS. 1 and 2 may be preset to any given date or time, a reference mark or star within the star field may be suitably aligned with the horizon rim 4 or with any other easily recognisable characteristic point of the overall form of the device and then, by feel and with reference to a printed tabulation, the device may be advanced the desired number of hourly steps or indentations to achieve the correct setting.

An accessory for the device may comprise a clear strip whose length is equal to a major circumference of the hemispherical, collapsed envelope (in other words substantially equal to a great circle of the spherical envelope before collapsing) and on which are marked the apparent yearly movements of the sun and planets in relation to the fixed stars. Such a strip is shown as 9 in FIG. 3 and when joined end-to-end to form a loop is of such a dimension as to fit neatly into and around the device to produce a display of the true geocentrically viewed paths of the sun and certain planets among the fixed stars. The strip could be manufactured at low cost with markings consistent with an annular plot of the sun and planets and would indicate the "normal" movements of the planets as well as the true geometrical forms of the retrograde or looping movements of the planetary bodies. In order that the strip can be placed into position as required the strip will include the "ecliptic" great circle represented as a straight line and at least one adjacent star, in this case Antares, to enable the correct part of the ecliptic "line" to be superimposed on the great circle printed on the envelope 1. Small, preferably adhesive backed, plastics dots can be stuck onto the device in colours representative of the planets and sun and possibly even the moon. The strip may then be removed to leave a plot of the appropriate positions of the sun, moon or one or more planets.

The positioning of the overlay strip 9 is as follows. Because the zodiacal belt, i.e., the Great Circle of the Ecliptic, lies in a plane other than that of the celestial equator, the ecliptic and the equator planes are angularly displaced. Thus in order to plot the planetary positions by way of the accessory strip 9, the line of the ecliptic (printed on the envelope) and its associated band of the zodiac should first be moved so that at the mid point of its arc the great circle of the Ecliptic is at least 10° above the horizon rim. Then the overlay strip 9 can be positioned and clipped in place having been correctly circumferentially oriented with one or two fixed stars or reference markings such as the star Antares shown as 29 in FIG. 3. In using the strip, so long as it is correctly aligned with the one or two reference marks or stars, any half of its length as desired can be in register with the inwardly concave portion since the sole function of the strip is to indicate the exact positions of at least one of the sun, moon and planets in relation to the zodiacal belt. When certain small, coloured or othewise identifiable, plastics dots are stuck onto the collapsed envelope underneath the transparent overlay they indicate the positions of the appropriate celestial bodies so that the overlay can be removed and the pole star returned to its correct latitudinal position. Now the bodies represented by the additional coloured dots can be made to "rise and set" with the fixed stars until such time as they require relocation having changed position with time. Of course the moon moves swiftly against the star background and hence, perhaps only the exact positions of "full" and "new" moon with the respective dates may be indicated on such an overlay. The further out a planet is from the sun (viewed heliocentrically) the slower is its movement against the stars and the less frequently need its position be adjusted.

The two valves 5 and 6 may alternatively provide mountings on which other transparent overlays may be attached to achieve temporary presentation of information for example, any additional annually variable information not marked on the device when originally made. These overlays may, for example, be used for information which will change annually so that the basic presentation of the heavens will be accurate over a period of several decades, the annually changing information can be presented on replaceable transparent overlays such as the overlay strip 9.

The overlay 9 in FIG. 3 shows the paths of the various planets and plots the positions of these bodies monthly throughout the year. By extrapolation it is possible to lot a position of any one of these bodies at virtually any particular day during the year.

A further accessory consists of a lamp assembly, preferably battery-operated, to project a low intensity light over the entire inwardly concave surface 2 of the device. The lamp would advantageously be affixed to the rim 4 of the instrument using small spring clips and would be self-contained and instantly removable. Such a lamp, if of sufficiently low intensity, would facilitate dark night outside viewing without causing scatter of spurious light to disturb the field of view of the natural celestial hemisphere. Preferably the lamp will be supplied with current by a length of wire to a battery holder having a switch thereon.

A further possible accessory in place of the above-mentioned lamp may comprise a centrally disposed projector again advantageously battery-operated, arranged to provide individual bright spots representing certain desired celestial bodies, for example five such spotlights could be provided and calibrated to represent the position of the five major planets, Mercury, Venus, Mars, Jupiter and Saturn as points of light which could be coloured to show against the star-field. The projector may desirably consist of a central nest of miniature, independently swivelling tubes each with a pin hole aperture illuminated by a common bright light source.

The internal rigidifying hemisphere 7 of FIG. 2 may be replaced by an external body of hemispherical, spherical or similar form but which is fitted onto the concave portion of the device while the envelope is manipulated to progress the device to a new time or date configuration. The external hemisphere could then be removed until it is next needed.

Alternatively, the inner hemisphere 7 or the above-mentioned outer hemisphere may be provided with an array of holes into which the nipple or the valve stem of one of the valves 5 and 6 may be received. In this instance, instead of advancing the celestial pole along a track 8 to simulate time lapse it would instead be held stationary in the hole of appropriate elevation above the horizon and the envelope manipulated to simulate rotation of the celestial display around the pole. By providing the holes in a "spiral" array extending between the apex and the rim of the rigidifying hemisphere it should be possible to allow for a much greater number of different elevation settings, possibly as many as 90 in which case the device can be accurately set to provide an accurate representation of the heavenly display appropriate to locations on the earth's surfaces spaced apart at intervals of 1° of latitude.

As yet a further alternative construction the hemisphere 7 may be replaced by an internal ring which reinforces the horizon rim alone of the device. This ring may have a circular cross-section or its section may be of some other form, for example in the form of a tear drop whose circular portion engages and conforms with the extreme rim of the envelope and whose "apex" extends up away from the rim.

Contrary to the prior art "celestial globe" presentation displaying a mirror image which is mentally "inverted" by the observer, the present device presents on a concave surface the true display relevant to a particular geographical location.

In FIG. 3 the paths of the various planets have been illustrated on the overlay which also includes the positions of several stars which coincide with the planet field. The positions and loci represented on FIG. 3 can be identified as follows:

| Mercury | is referenced | 21 | Pluto | is referenced | 28 |
| Venus | do. | 22 | Antares | do. | 29 |
| Mars | do. | 23 | Spica | do. | 30 |
| Saturn | do. | 24 | Regulus | do. | 31 |
| Jupiter | do. | 25 | Pollux | do. | 32 |
| Neptune | do. | 26 | Pleiades | do. | 33 |
| Uranus | do. | 27 | | | |

The positions of the various celestial bodies may be marked on the surface of the envelope 1 by printing in a permanent ink (e.g., silk screen printing), forming as indented characters which are wiped with a suitable pigment, or hot foil stamping, i.e., pressing a plastics foil between the envelope 1 and a heated embossed die.

We claim:

1. A device for displaying the positions of at least some of the celestial bodies of the celestial sphere, comprising a flexible envelope collapsed and evacuated and sealed in a hemispherical configuration presenting an inwardly concave wall and an outwardly convex wall joined by a horizon rim, a low-friction coating on the interior of the envelope and a rigidifying horizon ring member enclosed by the envelope and having a diameter substantially equal to the diameter of said flexible envelope, said horizon ring member having a rounded rim at the horizon and said envelope bearing the entire celestial sphere distributed over said inwardly concave and outwardly convex walls, whereby manipulation of the envelope enables a different, truly hemispherical portin of the celestial sphere to be presented on said inwardly concave surface of the envelope.

2. A device according to claim 1, wherein the celestial bodies are marked on the surfface of the flexible envelope in a permanent manner.

3. A device according to claim 1, wherein said envelope is made of a flexible synthetic plastics material.

4. A device according to claim 1, and including pegs formed on the surface of the envelope coincident with the location of the north and the south celestial poles.

5. A device according to claim 4, wherein said pegs comprise air-tight valves which both allow the flexible envelope to be evacuated and also seal the envelope against ingress of air once evacuated.

6. A device according to claim 4, and further including an overlay strip of a rigid transparent material having marked thereon a line which is an arc of a great circle of the hemisphere formed by the envelope, said strip further defining aperture means to receive one of said pegs.

7. A device according to claim 4, and further including an overlay in the form of a disc of transparent material and marked with angularly spaced graduations representing intervals of time of a 24 hour period.

8. A device according to claim 1 and further including a rigid hemispherical shell enclosed within the flexible envelope to allow free movement of the flexible envelope over the surface of the shell.

9. A device for displaying the positions of at least some of the celestial bodies of the celestial sphere, comprising
   a. a flexible envelope collapsed, evacuated and sealed in a hemispherical configuration presenting an inwardly concave wall and an outwardly convex wall and a horizon rim joining said inner and outer walls, said envelope bearing a representation of the entire celestial sphere distributed over said inwardly concave and outwardly convex walls;
   b. a low-friction coating on the interior of the envelope;
   c. a rigid hemispherical shell having a rounded rim at the horizon, enclosed within the flexible envelope to allow free movement of the flexible envelope over the surface of the shell;
   d. circular tracks formed in said hemispherical shell; and
   e. at least one nipple formed on the inner surface of said envelope coincident with a celestial pole of the celestial sphere, said nipple being shaped to engage loosely in one of said tracks;
whereby manipulation of the envelope enables a different, truly hemisphereical portion of the celestial sphere to be presented on said inwardly concave surface of the envelope.

* * * * *